US006975224B2

(12) United States Patent
Galley, III et al.

(10) Patent No.: US 6,975,224 B2
(45) Date of Patent: Dec. 13, 2005

(54) REUSABLE SELF CONTAINED ELECTRONIC DEVICE PROVIDING IN-TRANSIT CARGO VISIBILITY

(75) Inventors: C. James Galley, III, Smithtown, NY (US); Robert M. Magown, Norwell, MA (US)

(73) Assignee: Navitag Technologies, Inc., North Quincy, MA (US)

( * ) Notice: Subject to any disclaimer, the term of this patent is extended or adjusted under 35 U.S.C. 154(b) by 0 days.

(21) Appl. No.: 10/455,248

(22) Filed: Jun. 5, 2003

(65) Prior Publication Data

US 2004/0066328 A1 Apr. 8, 2004

Related U.S. Application Data

(60) Provisional application No. 60/386,144, filed on Jun. 5, 2002.

(51) Int. Cl.[7] .................................................. G08B 1/08
(52) U.S. Cl. .............................. 340/539.18; 340/539.1; 340/10.1; 340/10.33; 340/425.5; 702/188; 702/185
(58) Field of Search ..................... 340/539.18, 539.1, 340/10.1, 10.33, 425.5; 702/188, 185

(56) References Cited

U.S. PATENT DOCUMENTS 4,057,273 A  11/1977 Carr
6,266,008 B1  7/2001 Huston et al.
6,339,397 B1 *  1/2002 Baker .................... 342/357.07
6,711,496 B2 *  3/2004 Denton ....................... 701/207
6,826,514 B1 * 11/2004 Antico et al. ............... 702/188
6,870,476 B2  3/2005 Cockburn et al.

* cited by examiner

Primary Examiner—Daniel Wu
Assistant Examiner—Tai T. Nguyen
(74) Attorney, Agent, or Firm—Hamilton, Brook, Smith & Reynolds, P.C.

(57) ABSTRACT

A tracking and security device that is self-contained, portable and easily secured to a shipping container. Since the unit can be easily attached and removed from a container and is relatively inexpensive to produce, the unit can be purchased and controlled by the owners of cargo, rather than the transportation service providers or owners of shipping containers. The device monitors and records positional information at a daily or other frequency dictated by the cargo owner, and reports this information as well as other events, such as suspicious entry into the container, over a satellite communication system or other wireless communication network. Access to status and/or position information is provided a secure fashion through Internet access to a centralized database. The device empowers an importer/exporter, or really any small business engaged in long distance shipment of goods, to control in-transit, real-time status and location information for their cargo without relying on third party sources, such as transportation carriers, to provide such data or to pay their service fees.

16 Claims, 10 Drawing Sheets

REUSABLE SELF CONTAINED ELECTRONIC DEVICE PROVIDING IN-TRANSIT CARGO VISIBILITY

RELATED APPLICATIONS

This application claims the benefit of U.S. Provisional Application No. 60/386,144, filed Jun. 5, 2002, the entire teachings of which are hereby incorporated by reference.

BACKGROUND OF THE INVENTION

The present invention relates to monitoring cargo while in transit, and in particular to a portable, reusable electronic device that provides for locking and tracking of cargo containers.

The shipment of goods via containers was introduced in the early 1950s as an alternative to the ancient method of general loose cargo handling (also known as break-bulk shipping). Since then, container shipping has become a preferred way to move merchandise, especially over international routes, and has displaced break-bulk shipping for all but the largest of goods. Containers provide many advantages including:

- cargo may move from an inland point of origin in one continent to an inland of destination in another continent, without the need to handle the cargo itself, so that a container may move seamlessly among a multiple modes of transportation from a truck chassis onto a container ship and then back again onto another truck, rail, or barge;
- standardization of container unit size, which has introduced significant efficiencies into the management of shipping, warehousing and general distribution processes; and
- greater security from theft and improved protection from breakage, since it avoids the manual handling that is required for break-bulk or general loose cargo shipments.

Dramatic growth in the container shipping industry is one result of these improved efficiencies and lower cost of transport. Container shipping has been, in fact, an important mechanism in allowing manufacturers around the world to be competitive in foreign markets.

The container industry is still a relatively fragmented industry of more than 500 companies operating thousands of vessels. As the number of carriers increases, the frequency of sailings and the speed of vessels improve, providing manufacturers with the ability to offer products around the world with shorter delivery times and lower transportation costs. In the U.S. alone, for example, there are 32,000 import and 2,500 export companies who utilize services provided by others. There are no reports available that identify the number of shippers around the world, but the number of individual companies utilizing international container shipping in some form or another has probably grown to the hundreds of thousands.

While containerization allows goods to be transported from an origin point to a destination point in a single medium, tracking a shipment requires participation of a wide variety of vendors within the supply chain. This is becoming increasingly important, because as shippers try to maintain correct inventory levels, they need greater visibility into the status and location of their shipments. One of the challenges to overcome is a lack of information standardization between vendors. Communication between all parties involved typically does not exist.

Consider the typical steps involved in moving a container from an in-land origin point to an in-land overseas destination. First, a shipper requests that his goods be moved, by contracting it with a carrier or freight forwarder. The carrier/forwarder then notifies a trucking company of the request, who then dispatches a truck to a designated port to pick up an empty container. The port releases a container, and the trucking company delivers the empty container to the shipper's location. The shipper inspects, loads and seals the container, releasing it to the trucking company.

The trucking company then moves the sealed container to a designated port. The port accepts the container, and positions it to be loaded on a vessel. The port then advises the carrier of the arrival of the container. Next, when a vessel arrives, the port loads the container, and confirms to the carrier that the container now is loaded. The vessel travels to multiple overseas ports, with the carrier supplying destination port unloading instructions prior to arrival at the designated arrival port.

The container is eventually unloaded at the appropriate destination port. At this point, it may still need to be moved to an inland port via rail, barge, and then truck (based on the ultimate destination), with the carrier typically notifying customs and a receiver of at least the arrival at the first port. The receiver notifies a customs broker, and the customs broker clears the goods with customs. After approving the container's release, a receiver confirms container clearance and provides delivery instructions to a carrier. The carrier, such as a trucking company, is then notified of arrival at the destination port with paperwork to pick up the container. The port releases the container to the trucking company which then delivers the sealed container for unloading at the destination. The receiver inspects and removes the seal, unloads the container, and releases the now empty container to the trucking company. The trucking company can now return the container to an appropriate port.

It can be appreciated that each service provider in this chain has information concerning the container shipment; however the systems they use are not all compatible or even use the same language. If the original shipper (the owner of the goods inside the container) needs to track a shipment, he needs to undertake a massive data integration project with each service provider, or else contract shipment to a company that offers land changes for supply chain visibility. At a minimum, messaging standards between service providers in far-flung countries would have to be converted to a form that is suitable for use by the shipper. Even if the communication difficulties are resolved, the issue of most data being historical limits its value. For example, where a container is located isn't typically part of the data recorded—an event is recorded only when responsibility for the container changes hands, such as when it is transferred between service providers.

The quality of this information can vary widely based on the sophistication and integration of the systems utilized by the parties and as well as the quality and dedication of the individuals entering data. Many of these parties rely on some sort of manual data entry and validation by field personnel, and thus are susceptible to human error even if compatible systems are in place.

Furthermore, real time security data is practically non-existent. The shipper typically places a plastic or soft metal seal on the container and records a number on their documentation. Upon receipt, the receiver confirms that the seal is still intact and that the container has not been tampered with. Thus, the first notice of a security breach is typically upon delivery at the destination, at which point it is too late to take actions to avoid inventory issues, or establish where the invasion occurred. Containerization has significantly reduced incidents of theft over break-bulk shipments, but with the increase in volume of international trade this is still a common occurrence.

With only 4% of the six million containers entering U.S. ports annually being inspected, there is also a substantial threat that dangerous materials or weapons could be imported via container, potentially bringing commerce to a stand still. There are numerous government agencies that are involved in security initiatives that could make use of better methods and techniques for tracking cargo shipments.

Numerous prior art devices and systems exist for tracking the location of mobile units, including vehicles and/or persons. These systems are capable of monitoring present position, progress along a given route, determining that an emergency has occurred, and other functions. They invariably use electronic position sensors, Global Positioning System (GPS) receivers, Long Range Navigation (LORAN), or similar devices to obtain a position, and then report that position to a central location via a radio modem. In addition, cargo security systems that involve provisioning for physical resistance or other dissuasion methods are also known in some depth.

The problem with these prior art systems is that none address the fact that an owner of the cargo itself does not have ownership of a container in which cargo is shipped, nor does a cargo owner or other shipper have any control over the equipment utilized to move the container in various transportation modes. It is unrealistic to expect shippers of international goods to purchase a fleet of containers simply to satisfy their own information needs. The ocean carrier typically provides containers as a cost of doing business. It would certainly not be practical for hundred thousands of small imports/exporters to each have their own container.

Government agencies might be enlisted to mandate that ocean carriers install tracking devices on every container in their fleet, but the scope of each government's authority in coordinating this makes it a remote possibility that this would ever occur worldwide.

It is also the case that only certain shipments are worth the effort to be tracked. For example, certain shippers might not wish to pay additional money associated with tracking shipments for which risk of theft is minor or insignificant, such as in the case of grain shipments and the like. However other shipments which might include, for example, consumer electronics and or newly manufactured vehicles, would potentially be worth the effort to track real time to the shipper.

Two types of security devices are typically used in the market today that provide for limited protection of cargo containers. These include physical locks and electronic seals.

A physical lock is a straightforward device. One closes both of the doors that are typically on the rear of a shipping container, and places locks on each door handle. Variations on this approach include bars, cables and housings. Unfortunately, these approaches have problems including: key distribution to recipients and/or loss of the key in transit to open the lock; custom requirements to inspect the locked container's contents upon arrival at a port; and the possibility that forced entry will occur through means other than the door, such as by removal of door hinges, access pins, prying of side panels and the like.

A second approach is to attach an electronic seal that records a variety of activities. The seal can typically be interrogated by a data collection device. The collection device is typically a hand held device that can, for example, document an action such as a door being opened. These systems typically lack the ability to transmit the information independently of ground personnel or ground systems, and thus cannot be used to monitor cargo in-transit. A more elaborate data solution exists that can interrogate and save data on the electronic seal—but an extensive network of proximity actuators is necessary to be placed throughout the entire intermodal journey with this approach as well.

Prior art asset management/recovery systems, like the well known LoJack™ system in the United States, are solutions that permanently attach a wireless transceiver to a mobile object such as a truck or car. The transceiver range and the type of data it provides is highly dependent upon the application and depend upon the vehicle remaining in range of terrestrial radio networks.

While both electronic seals and the asset management systems may deter and/or document entry into a container, they do not provide an opportunity to react quickly. A more proactive stance is required involving security breaches, not just from the security threat to standpoint but also from an inventory management perspective as well. A recipient cannot utilize compromised cargo, and alternatives need to be set in motion by the shipper as soon as possible to mitigate damages once a container has been breached, such as to ship duplicate goods.

Asset management solutions also only track the mobile equipment—not the cargo—and would represent a significant capital cost if deployed worldwide. For example, an asset management solution may track a truck or a ship but not the particular container carried by a truck or a ship. Given the competitive nature of the shipping industry, the cost associated with outfitting every container and/or truck with a tracking device has been thought to be prohibitive. The probability of carriers installing these devices on all of their modes of transportation any time soon is therefore quit slim. It is also unlikely that shippers will be willing to forego competitive pricing, in order to select only those carriers which make an investment to track their transportation equipment.

SUMMARY OF THE INVENTION

What is needed is a tracking and security device that is completely self-contained, portable, and which can be easily and securely affixed to a container. The device should not impede entrance to a container or disrupt standard present-day intermodal container operations. It should monitor and record/report positional information at a frequency dictated by the user, and report entrance into a container, suspicious activities, and the like. The unit should be easily attached and removed from a container, so that it can be economically returned to the device owner, which can typically be the owner of the cargo itself.

This approach empowers an importer/exporter or other shipper (or even government agency) with control over in-transit location and status data, without reliance on third party sources such as transportation carriers and other service providers. In this approach, because the shipper controls deployment of the device, he has the ability to choose the cargos he wants to monitor. He can also be assured of obtaining the same status data on his cargo, regardless of the service providers that actually handle the container en route. This allows the shipper to change service provider partners whenever he wishes and still receive data in a consistent and known format. The status information is available through secure Internet access, integrated with existing system, or via email messaging.

In one embodiment, the unit is secured, typically at the transport origin, with a mechanical and electronic locking system. The unit remains in place until completion of the journey, even as the container is handled through several different modes of transport.

The unit preferably also includes one or more sensors located on cables to provide security status information. One sensor may be a door lock sensor, which is secured through a latching mechanism on the container. Another sensor, which can be light or other physical change sensor, is extended through a door opening and placed inside the closed container. Should the security of the container be breached, by disconnecting the door lock sensor, or activating the internal light sensor, the unit immediately sends a message alerting the owner of the device of the event via satellite communication and providing other relevant information, such as a location.

Other types of sensors such as moisture, temperature, pressure and others can be utilized depending on the cargo.

The fact that the unit does not rely on third party data entry eliminates concerns about data integrity, security of information, and timely entry on the part of service provider personnel.

In one embodiment, the mechanical mounting and locking mechanism used for the device includes a hollow restraint latch that fits over a bar associated with the exterior of a truck or shipping container, such as a keeper bar. The unit thus straddles over the external vertical locking bar commonly found on the door of a shipping container or truck trailer. A restraint latch locks into and mates with the main unit housing. A locking pin holds the restraint latch in position when a device is properly attached over the bar, remaining locked until the container reaches its destination.

Electronic functions of the device provide for activation/deactivation of the restraint latch. Activation codes may be entered on a keypad associated with the device itself, or preferably through auxiliary input devices, such as a handheld properly programmed Personal Digital Assistant (PDA). In the case of using PDAs, the activation can be accomplished via bi-directional infrared link, Bluetooth, or other types of wireless links. An inverse sequence is used to electronically deactivate the device.

The device is therefore small and hand portable, and runs on battery power. This enables its movement from container to container. Thus, once the device arrives at a destination, it may be detached from the container and then reutilized by attaching it to another container at the destination and/or by returning it via post to an owner for reuse.

The device is entirely self-contained and is thus capable of tracking cargo over a long range or even global scale. By self-contained, it is meant that the device operates on local battery power and makes use of long range data networks, such as satellite data networks. An owner of cargo may therefore attach the device to a container at his own origin point, e.g., his own warehouse. He also need not purchase or lease access to additional infrastructure in order to have access to in-transit visibility of data for the cargo across multiple modes of transportation, other than standard Internet access.

The device has a universal mounting system, making it attachable to cargo containers that may be transported using different transportation modes including ocean vessels, trucks, rail cars and the like. The same unit may thus be used to track cargo through these several transportation modes that might be utilized between a given origin and destination, even if the different modes are not even known to the shipper.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
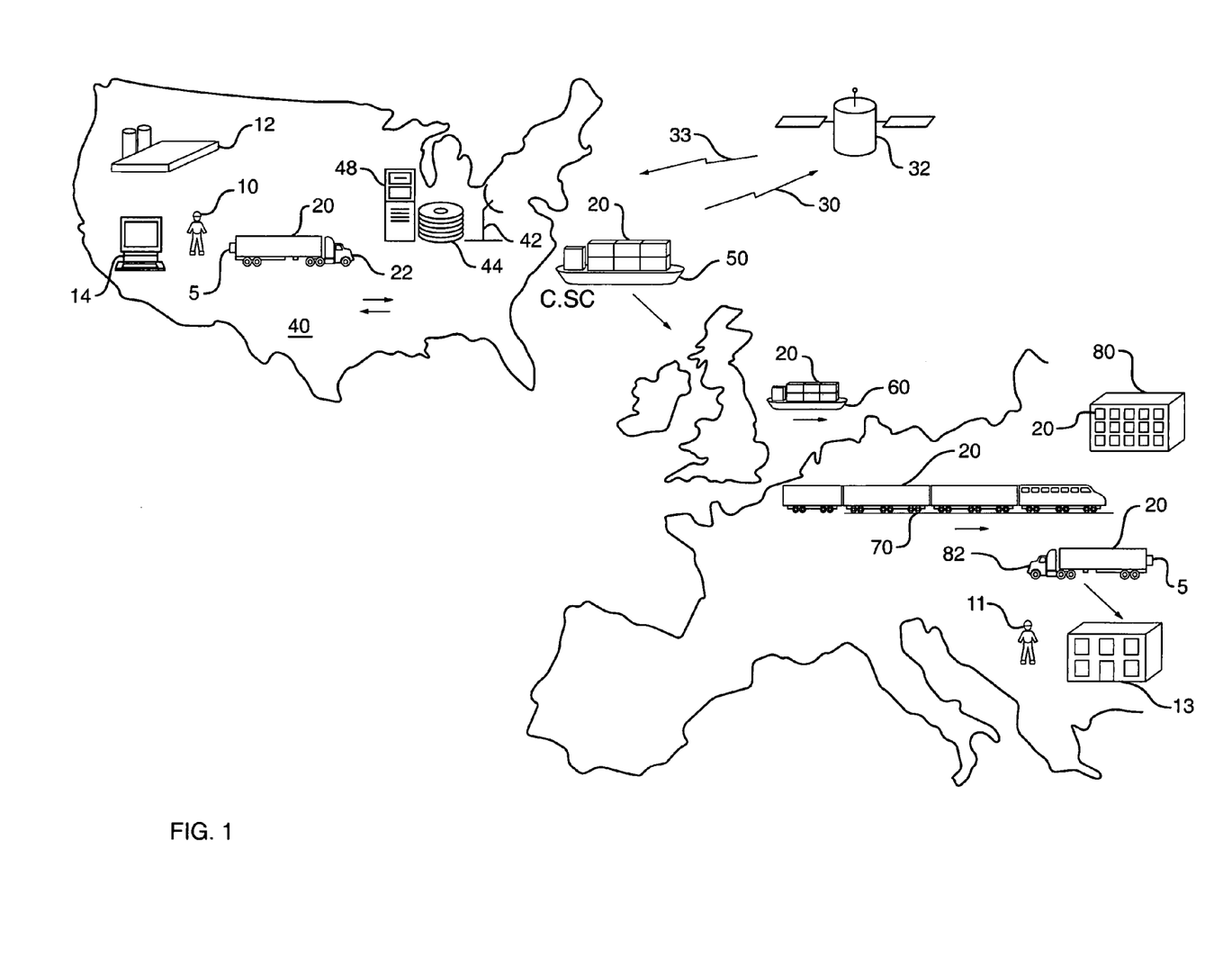
FIG. 1 is a diagram illustrating a container having a tracking device attached, and a typical movement from an inland origin point to an inland destination point in a different continent.

FIG. 1 illustrates a typical sequence of events that occur in multimodal transport of goods by container. In this example, a shipper 10 located near Austin, Tex. in the United States is a manufacturer and wholesaler of personal computer subassemblies. The shipper 10 wants to use carriers, freight forwarders, or other service providers to ship a container 20 filled with goods at the lowest possible cost. These service providers normally supply the container 20 to the shipper 10 as a cost of doing business.

Here, a customer 11 in a destination location 13 near Frankfurt, Germany has placed an order for computer components. The customer 11 is also referred to herein as the receiver 11 of the container 20. The shipper 10 places the goods in the container 20 at a location such as his Texas warehouse 12. The shipper 10 here then attaches an electronic tracking and security device 5, as will be described in greater detail below, to the container 20 before it is placed on a first transport mode such as truck 22.

The device 5 remains with the container 20 throughout its journey to Germany. During this journey, the device 5 transmits position and other status information via a wide area communication network such as by sending radio frequency signals 30 to a satellite 32. The satellite 32 returns data signals 33 to a ground station 40. The ground station 40 receives signals via a satellite antenna 42, and forwards this information to a backend system 48 that decodes the data received 33 and stores the data in a database. The data can be made available to shipper 10 via query 14 through the backend system 48 such as may be connected through the Internet. The query result may also be reported in any convenient agreed to manner, such as by fax, email, page, etc.

This system thus provides any shipper 10 who has access to the Internet to real time status and position information for containers 20 to which he has attached devices 5. As will be understood shortly, the devices 5 thus provide a system that is under complete control of the shipper 10. This system is quite unlike prior art systems that operate under exclusive control of transportation service providers such as freight forwarders, or transportation carriers who operate trucks 22, ships 50, barges 60, trains 70 or other modes of transport utilized to move the containers 20.

It should thus be understood that the container 20 may travel using various modes of transport, and even under control of various service providers that may or may not be known to the shipper 10, and yet the shipper 10 may still track the container 20 status and location.

At the shipper's origin location, such as at his own warehouse 12, the shipper 10 inspects, loads and seals the container 20 attaching the electronic device 5. At this point, the shipper 10 releases the container 20 to a carrier such as a trucking company which operates a truck 22. The carrier then trailers the sealed container 20 by truck 22 to an overseas port that services shipping containers, such as at Charleston, S.C. After arriving at Charleston, the container 20 is loaded onto a ship 50 along with many other similar containers. The port advises the carrier that the container has arrived. A vessel 50 eventually arrives at the port, and the container 20 is loaded onto it, with the port advising the carrier of its content being loaded.

Vessel 50 then travels across the ocean to various ports and eventually arrives at an intermediate port which may, for example, be Liverpool, England. The container 20 is then unloaded here. For example, the container 20 may be moved onto a barge 60 which is under control of yet another transport service provider. Upon arrival in Europe, customs agents and the receiver 13 may be given notice of arrival at Liverpool. However, the act of loading onto a barge 60 may not, for example, be reported by existing systems—although the device 5 will still be operating to inform the shipper 10 as before.

At this point, should custom officials need access to the container 20 to inspect it, they can access the contents of container 20 without deactivating or damaging the device 5. The device 5 will send a message 30 indicating that that the container has been entered, and the backend system 48 will notify the shipper 10 of the event via prior agreed to channels (web, fax, email or page).

Eventually, the barge 60 arrives at continental port such as Amsterdam, Netherlands. Here the container 20 might be loaded onto a train 70 along with many other containers, the train operated by yet another carrier. At this point, various documents may again change hands and/or with customs and/or customs brokers again becoming involved. Eventually the train 70 arrives at a depot 80 in Germany where the container 20 may be unloaded. A truck 82 operated by a German carrier then picks up the container 20 and moves it along a final leg to the destination 13 in Frankfurt.

It can be appreciated that without the expediency of the device 5, for the shipper 10 to have visibility into the location and status of the container 20 would require coordination among a variety of service providers including at least the operator of the truck 22 in Texas, overseas carrier 50, English Channel barge company 60, European intra-city rail transport carrier that operates the train 70, as well as the trucking company in Frankfort that operates the truck 82.

The shipper 10 need only purchase and/or lease access to devices 5, and does not need to purchase and/or lease access to a vary of other infrastructure equipment that might otherwise be necessary to track and/or monitor the container 20 as it is handled by the providers of various transportation modes used in transit from the origin 12 to the destination 13.

The device 5 thus tracks the cargo—not the intermodal transportation apparatus—and thus provides shipper 10 or other cargo owner with the ability to choose which cargos are monitored and how they are monitored. The cargo owner can thus introduce the device 5 anywhere within the transportation supply chain to provide security information that the shipper 10 needs to protect the cargo from theft.

Figure 2:
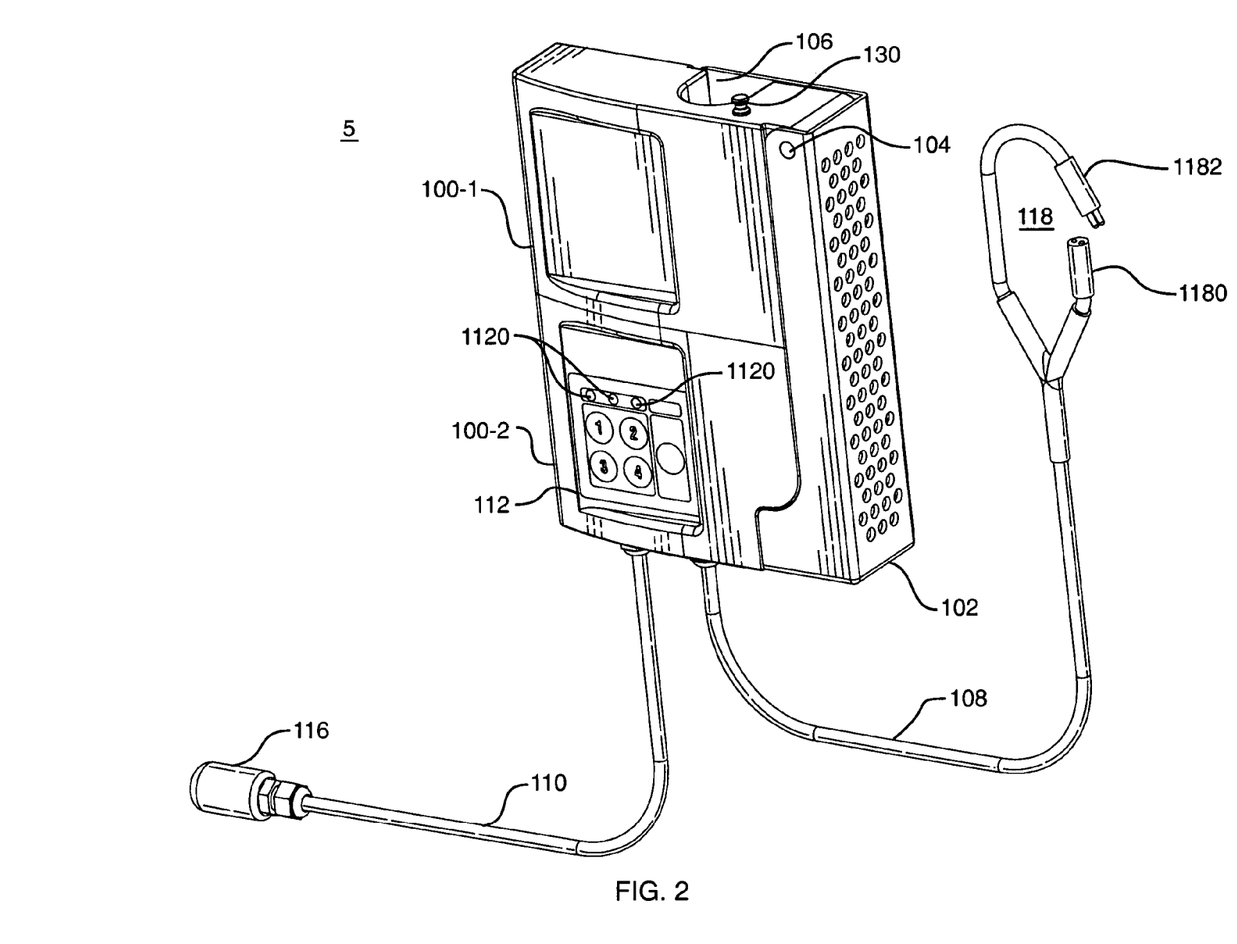
FIG. 2 is an external view of a device constructed in accordance with the invention.

A government might also use devices 5 use to protect ports from importation of dangerous cargo;

FIG. 2 is a more detailed view of device 5. The device 5 generally consists of an upper 100-1 and lower 100-2 housing, and a restraint latch 102 which is hingeably connected to at least part of the housing 100-1 via a hinge pin 104. The housing has a rear recess 106 that is generally cylindrical in nature and running from top to bottom of the device 5. The recess 106 is designed to allow the device 5 to be secured to a vertical locking bar, to be described below.

A locking pin 130 assembly is also associated with the device 5 and is used to secure the device 5 mechanically and electronically in a manner that will be understood shortly. A keypad 112 may be formed on an exterior surface of the lower housing 100-2. In a preferred embodiment, a pair of sensing cables, including a lock sense cable 108 and light sense cable 110 are connected to the unit 5. A light sensor 116 attached to the light sensor cable 110 is capable of providing electrical signals to the electronics within the unit 5 when a container door is breached. Similarly, the lock sensor 118 associated with lock sensor cable 108 is capable of determining when a lock has been tampered with. Lock sensor 118 may, for example, be a plug 1182 and socket 1180 type sensor, whereby electrical continuity can be detected, i.e., if the plug 1182 is inserted into the socket 1180 or not.

Figure 3:
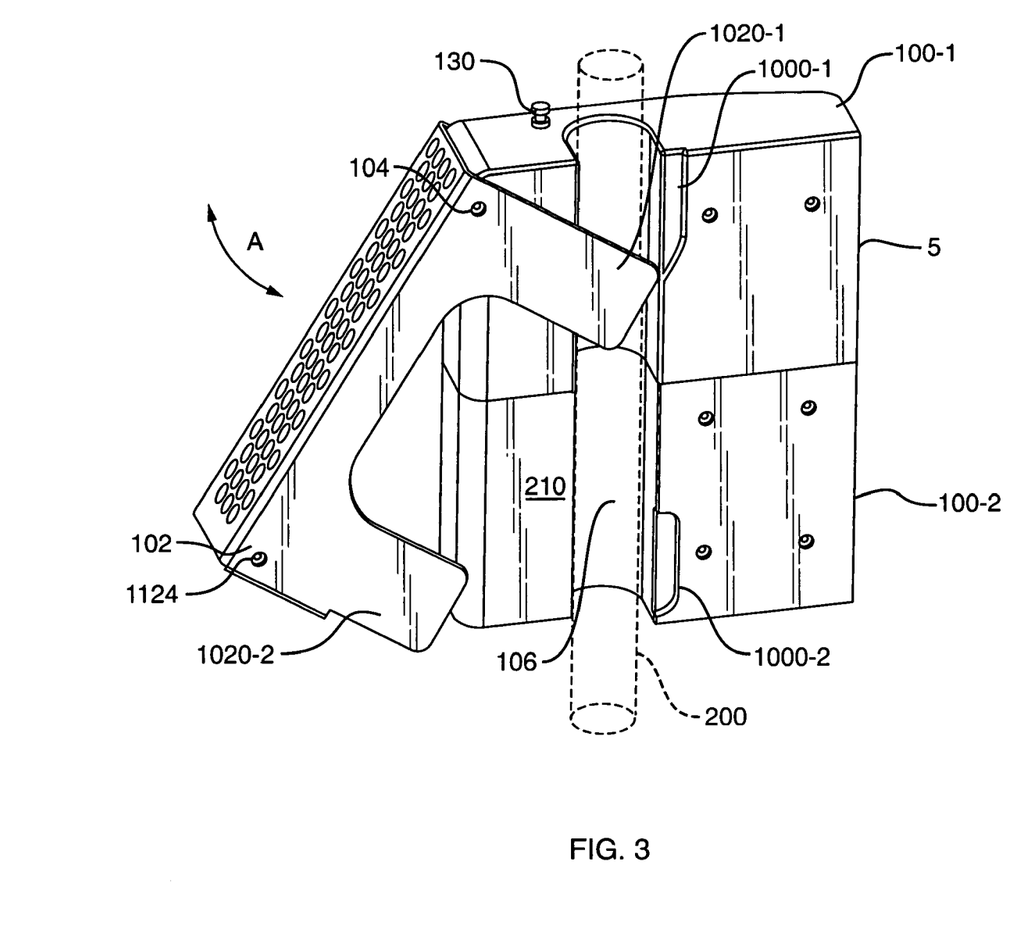
FIG. 3 is a rear view of the device showing how it is attached to a container.

FIG. 3 is a rear view of the device 5. The cables 108, 110 are omitted in this view. Here the recess 106 is more clearly visible and the restraint latch 102 is shown in a partially open position. The restraint latch 102 is thus moved to an opened or closed position as indicated by the arrows A, by rotating it about the hinge pin 104. The restraint latch 102 is used to secure the unit 5 against a vertical locking bar 200 (shown by the dashed lines in FIG. 3) as typically found on a door of a shipping container 20 or truck trailer. Tabs 1020-1 and 1020-2 formed on an upper and lower portion of the rear of the restraint latch 102 may fit into recesses 1000-1 and 1000-2 associated respectively with the upper and lower portions 100-1, 100-2 of the housing. A hole 1124 in the bottom of the latch 102 is used to allow the locking bar 130 to pass through the latch 102 and thus to mechanically and electronically secure the device 5.

Figure 4:
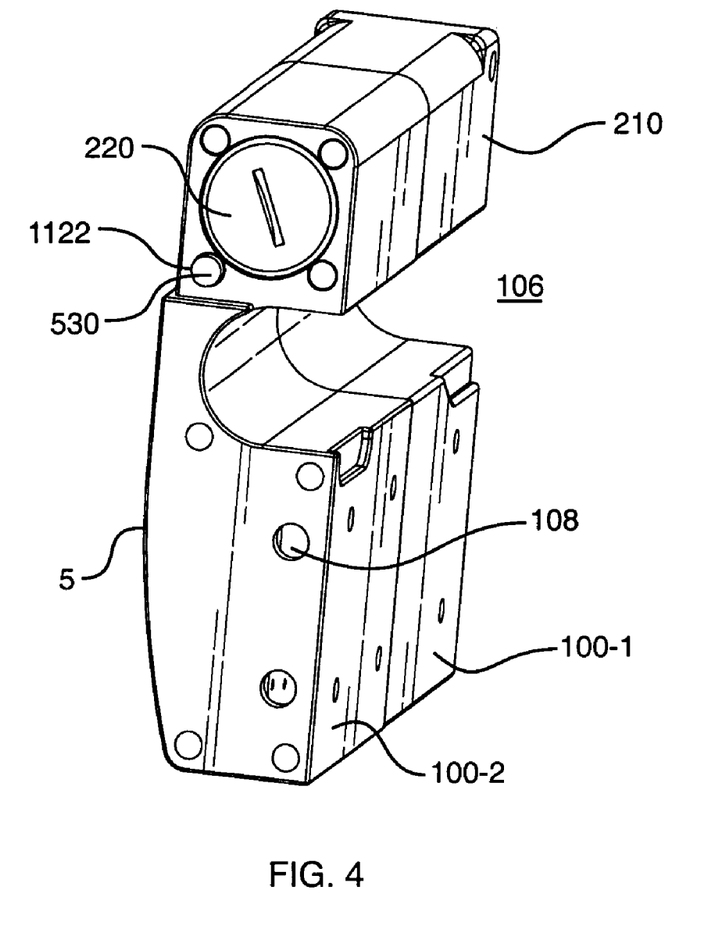
FIG. 4 is a bottom view of the device.

FIG. 4 is a bottom end view of the device 5 showing a battery chamber portion 210 that is accessible when the restraint latch 102 is in an open position (restraint latch 102 is not shown in FIG. 4 for clarity). Here, a battery chamber end cap 220 may be opened to insert one or more batteries such as "D" size cells to power the device 5. Also evident is a hole 1122 through which a bottom portion 530 of locking pin 130 fits when it is engaged to lock the restraint latch 102.

Figure 5:
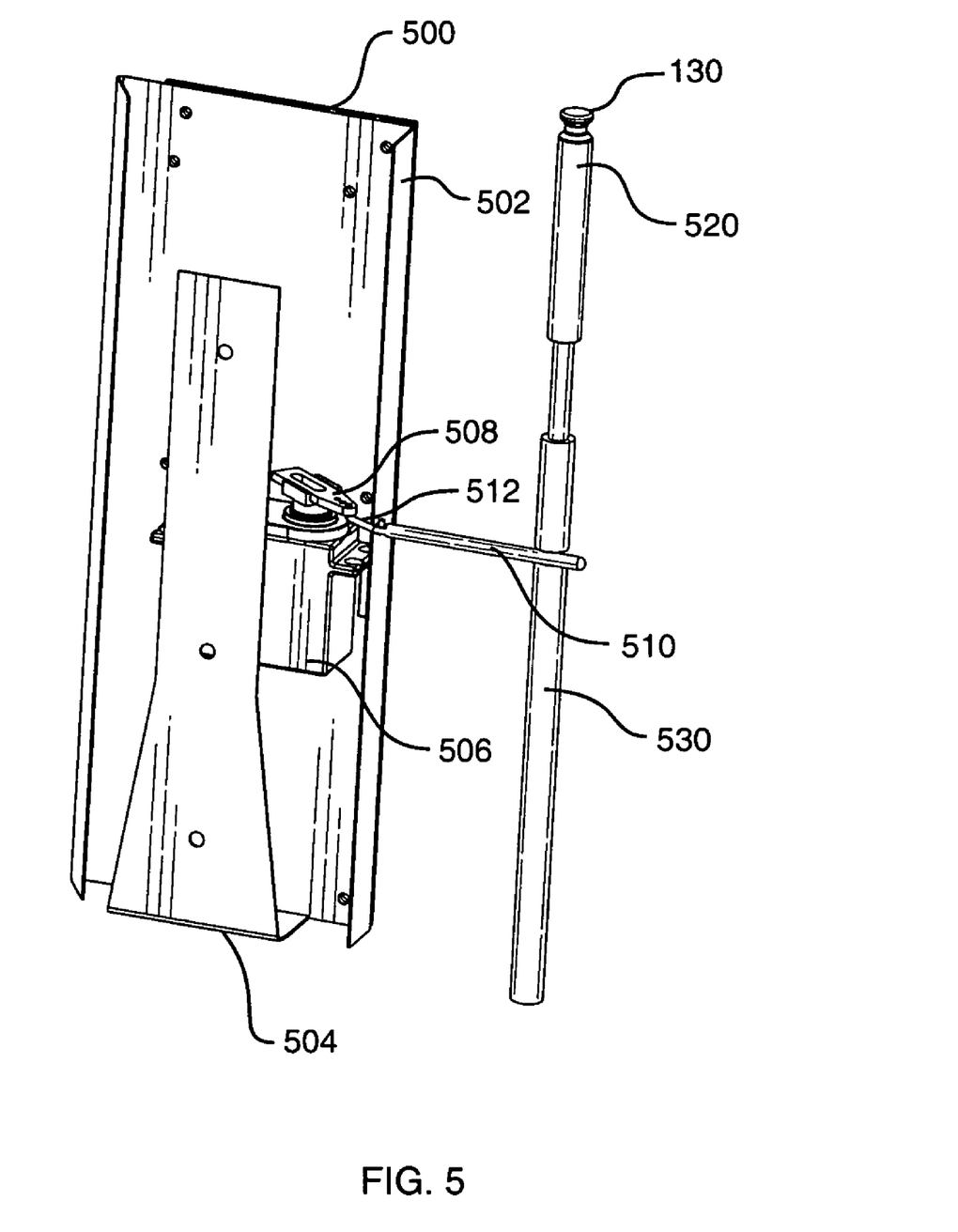
FIG. 5 is a view of the internal components of the device.

FIG. 5 is an isometric view of internal components of the device 5, consisting of a circuit board 500 having mounted thereon an antenna ground plane 502 and radiating antenna element 504. A horn mount servo 506 and servo horn 508 are used to extend or retract, via a wire link 512, an internal locking pin 510 which is located in between the upper locking shaft 520 and lower locking shaft 530. The upper and lower locking shafts 520,530 connect together and extend the entire height of the interior of the unit to form the pin 130. The extending portion of the locking pin 130 attaches to the top of the upper locking shaft 520 and is accessible on the exterior of the unit, allowing a user to lift and release the lower locking shaft 530 to pass through holes 1122 and 1124 and into the restraining latch 102, essentially locking the restraining latch 102 on the unit 5.

The servo 506 can thus activate or deactivate the locking pin 130 electronically. The circuit board 500 has electronics that control the pin 510 and other various components in a manner that is to be described to herein shortly.

The antenna 504 is tuned to operate at a radio frequency for data communications such as with a satellite communications system. For example, the radio antenna 504 related wireless data modem and circuitry (not shown) may operate properly with equipment that is available from a variety of vendors that communicate with the Argos system. The Argos system provides long range data communication as well as position information. However, other satellite systems might possible be used such as Globalstar, would be a more regional communication network and/or which may need Global Positioning System (GPS) receivers to provide position location information. In any event, the electronics in the device 5 provide position (and optionally other status information), to a server 40 that is accessible to the Internet in a manner which is known in the art.

Figure 6:
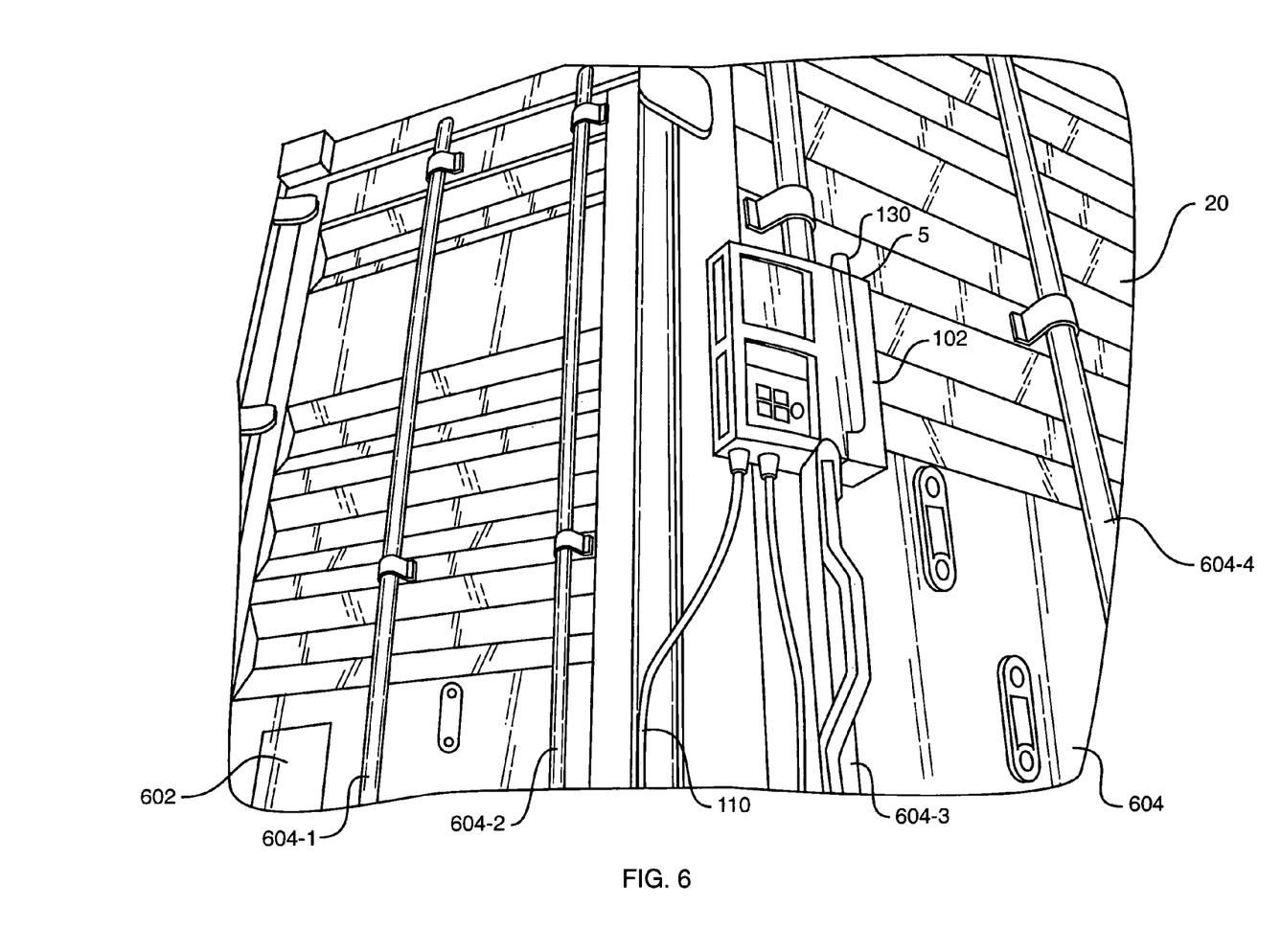
FIG. 6 shows the device attached to a vertical locking bar on a container.

Turning attention now to FIG. 6, one manner of installing of the device 5 onto a typical container 20 will be described in greater detail. The container 20 typically has two rear doors including a left hand door 602 and right hand door 604. Each of the doors 602, 604 have one or more vertical locking bars 604-1, 604-2, 604-3, 604-4. In a first step, the restraint latch 102 on a device 5 is opened such as by pulling up the locking pin 130 manually. Once the pin 130 is pulled up, the restraint latch 102 is then moveable to an open position.

The device 5 is then placed over the right hand container door 604 with the recess 106 straddling the vertical locking bar 604-3 closest to the gap between the two doors 602, 604. The restraint latch 102 is then pivoted to the closed position until the locking pin 130 drops down (through holes 1122, 1124) and clicks into position. The recess 106 in the back of the device 5 thus permits the restraint latch 102 to securely hold the device to the locking bar 604-3 5 for the duration of the shipment of the container 20.

Figure 7:
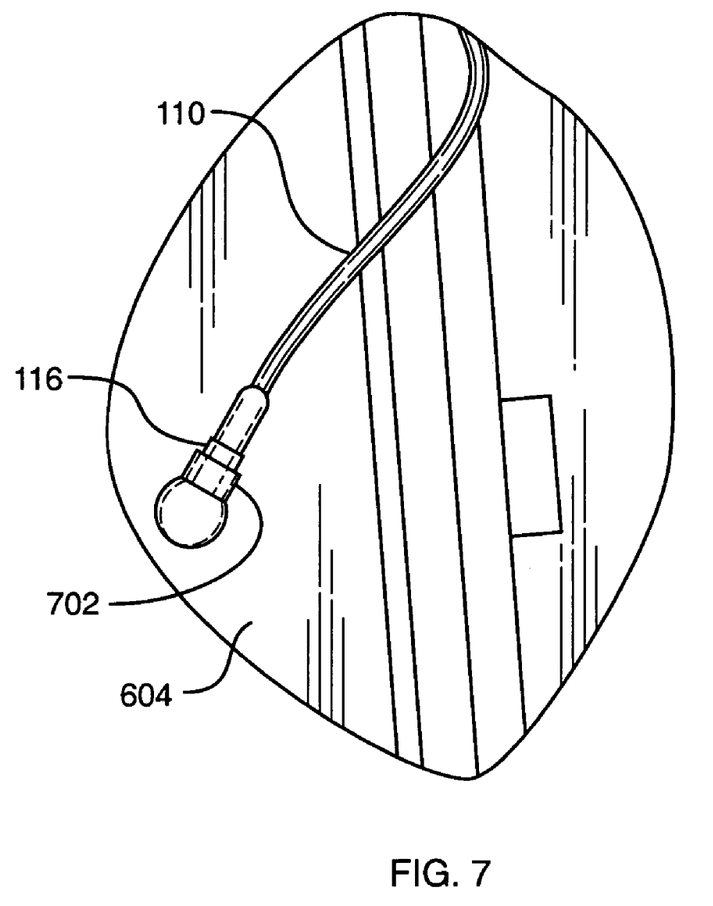
FIG. 7 is a view showing how the light sensor is attached to the inside of a door on a container.

Now with the device 5 secured to the container 20, the light sensor 116 and door lock sensor 118 can be installed. The light sensor cable 110 is fed through the door opening. As more particularly shown in FIG. 7, it is magnetically attached to an interior surface of the door 604, via a magnetic portion 702 which may be formed as a ferrule of magnetic material formed above the body of light sensor 116. Light sensor 116 is preferably placed inside the door 604 as far as possible, so that the cable does not catch or drag on cargo as it is loaded or unloaded from the container 20. A return shipment carton (not shown) for return of the device 5 may be placed in the container 20 at this point. This enables the receiver 11 to return device 5 to its owner (e.g., shipper 10) or other custodian via parcel post, overnight delivery service or the like once the cargo container 20 reaches its destination 13.

Figure 8:
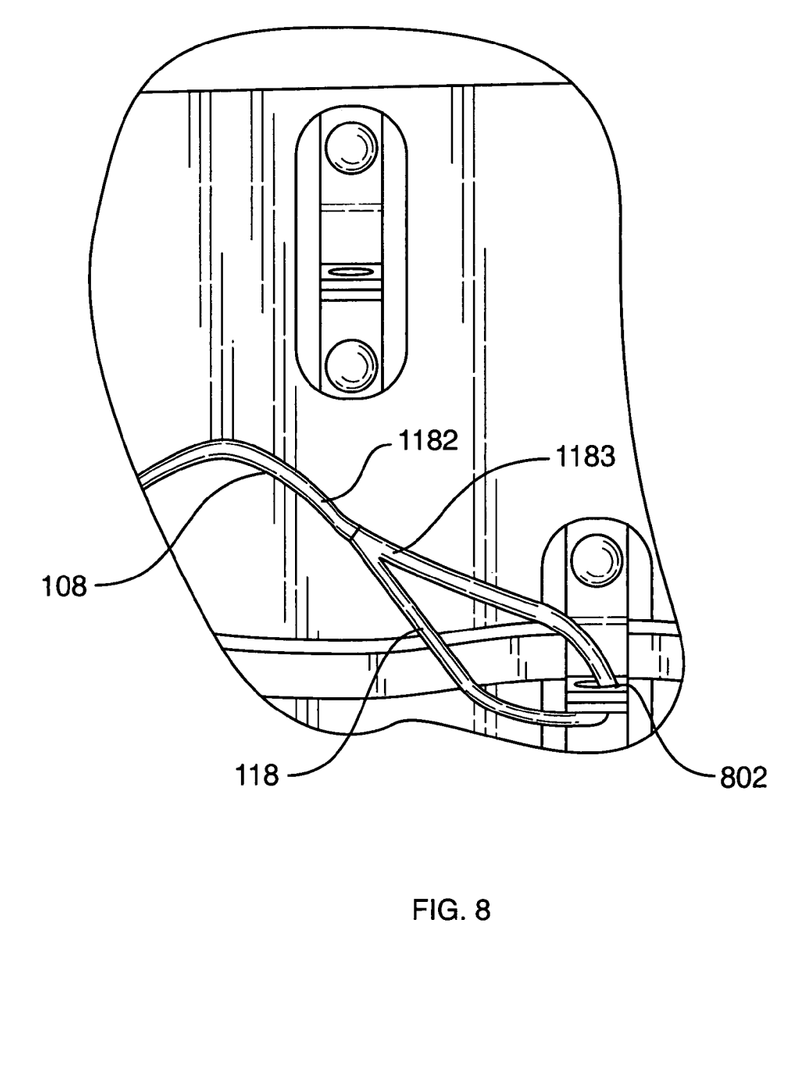
FIG. 8 is a view showing how a lock sensor is attached.

Next, as shown in FIG. 8, the door lock sensor cable 108 is fed through a door locking handle retainer hole 802, and the socket 1180 is mated to the plug 1182.

Prior to installing the device 5, the battery cap 220 can also be removed with new batteries being installed. The battery cap 220 is then reinstalled by turning its threaded portions clockwise. (It should be understood that other arrangements for the batteries are possible, such as bayonet caps.) To confirm that the device 5 is now powered on, lights 1120 (FIG. 2) on the front panel 112 may turn on for a brief period. For example, one of the lights 1120 may be a yellow flashing light that indicates that the unit 5 is ready to be attached to container 20.

Figure 9:
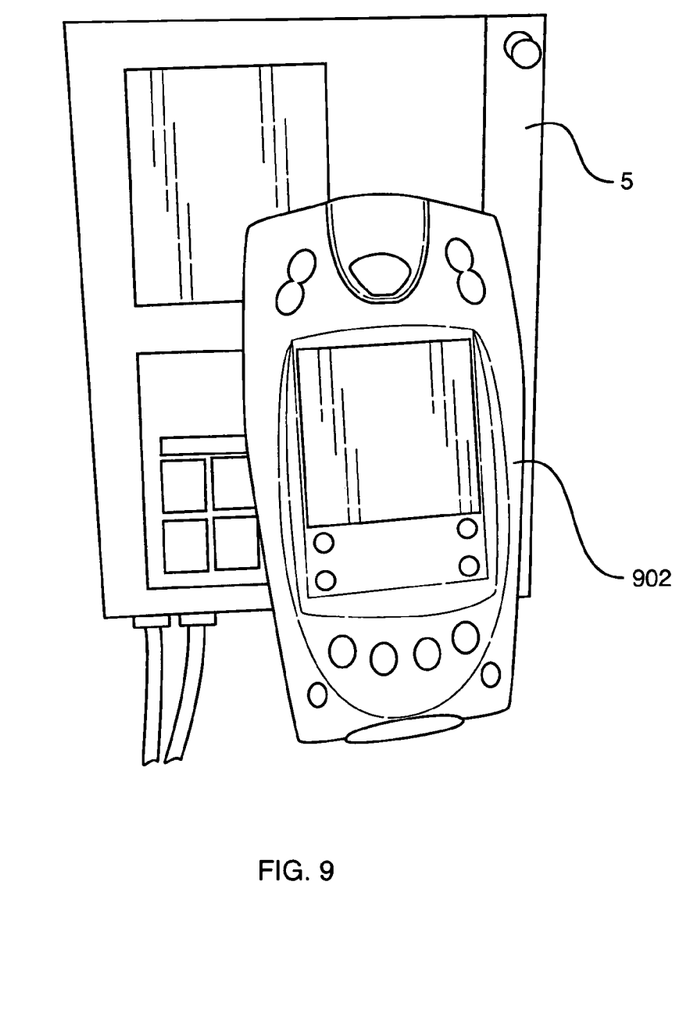
FIG. 9 shows how an activation device may be used.

At this point, the unit 5 is mechanically attached to the container 20, but still needs electronic activation. In a preferred embodiment, another device such as a Personal Digital Assistant (PDA) utilized with infrared sensors are used to securely activate the device 5. As shown in FIG. 9, such an activation PDA 902 is first placed in close proximity to device 5. A sequence of menus may then be shown on the screen of the PDA 902 allowing the shipper 10 to enter identification serial numbers for container 20, destination information, carrier information and other information relevant for the shipment. The activation unit 902 then initiates communication with the device 5 executing an activation sequence. The activation sequence may be encrypted or may use other suitable security measures to ensure that only authorized users are able to activate or deactivate the device 5.

The activation sequence may typically cause the servo 560 to operate, to further secure the pin 130 so that latch 102 locks in position.

Once activated, a green light 120 on the front panel 111 may be lit on the device 5 (it may blink approximately once a minute, for example), to indicate that device 5 is in use. Other lights may blink, such as during satellite transmission if so desired.

Returning attention briefly to FIG. 1, a container 20 having the attached device 5 then travels over its intended itinerary using various modes 20, 50, 60, 70 and 82 of transit to its final destination 13. During transit, status information is periodically provided via the communication link 30 to satellite 32 and ultimately to the backend system 48. Status notifications may be at intervals designated by the shipper 20.

The device 5 also preferably broadcasts messages on an instantaneous basis should the lock sensor 108 or light sensor cable 110 provides signals that indicate tampering with the container 20. For example, if the lock sensor 108 is tampered with such that the socket 1180 becomes disconnected from the plug 1182, a signal will be generated by the device 5 indicating that the lock has been tampered with. Similarly, in the event that the sensor 116 indicates light being detected within the container the device 5 will send a message.

It should be understood that other types of status sensors such as vibration, acoustic, temperature, humidity and other sensors that detect physical or environmental conditions of the container 20 could also indicate problems.

Deactivation includes an inverse sequence of events, i.e., entering in the unlock code into the keypad 112 or, alternatively, using a PDA 902 to perform an authorized deactivation sequence to electronically disengage the device 5. Mechanically, this then includes removing the door lock sensor 118 and light sensor 116, lifting the locking pin 130, and pivoting the restraint latch 102 to remove the device 5 from the vertical bar 603.

Data representing the encrypted deactivation sequence can be forwarded to the destination 13 (or a customer 11 or government official) via a secure Internet connection between the backend system 48 and a PDA 902. Deactivation is also by directional infrared link with an authorized PDA unit 902, and only authorized de-activation units or valid unlock codes entered into the keypad 112 can cause the device 5 to de-activate upon arrival at the intended destination 13.

The device 5 is small and portable and thereby can be moved easily from one container 20 to another container 20 under the direction of the shipper 10. Thus, for example, when the device 5 arrives at the destination 13 it can be re-attached to other containers that are traveling in a reverse direction. However, since the shipper 10 is typically the owner of the device 5 and/or its lessor, the device 5 will usually be placed in a return package and mailed back to the shipper 10.

The device 5 provides in-transit visibility cargo without requiring attachment to outside power sources such as power sources that might be available on the particular vehicles used for transit. The device 5 also does not rely on terrestrial communication networks such as local radio networks, cellular telephone networks and the like. The device 5 is thus capable of tracking a cargo container 20 over even a global scale. The owner 10 of cargo may attach a self-contained device 5 to any container 20 of his own interest, and need not purchase or lease access to additional infrastructure.

Furthermore, a universal mounting system is provided by the expediency of the recess 106 and restraint latch 102 that fit over a vertical locking bar 604 on a shipping container 20. The device 5 can thus be adapted to containers 20 handled by various, different, and even unknown types of providers of transportation services. Thus, different transportation modes including trucks, ocean vessels, trains, and the like may use the same container 20 and might be handled by different vendors en route to an ultimate destination point 13, and yet the device 5 still remains under the control of the shipper 10.

Figure 10:
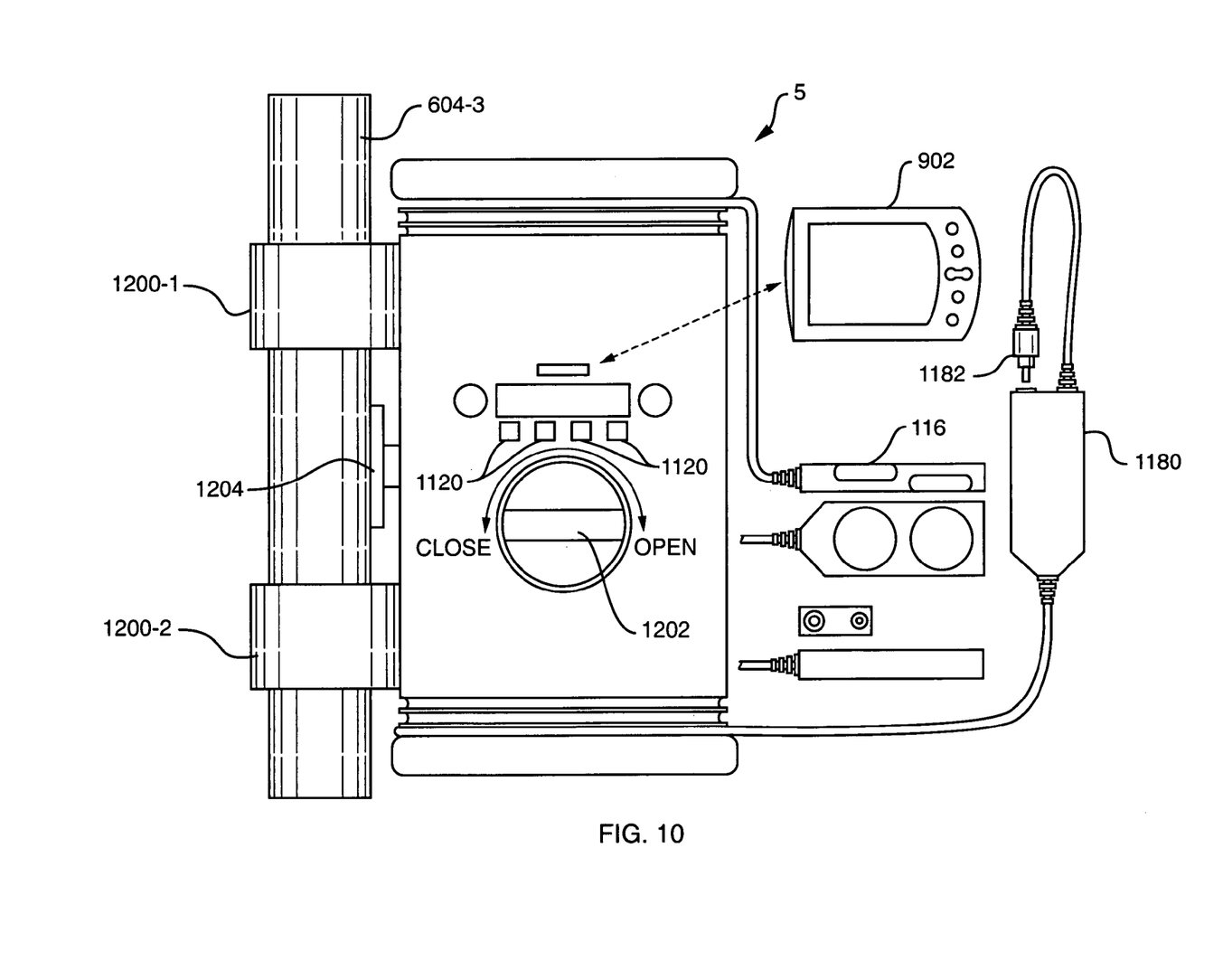
FIG. 10 is a view of an alternate embodiment of the device.

FIG. 10 shows an alternate embodiment of a device 5 having a mechanical configuration that is different from the embodiment shown in FIG. 2, but which provides the same functions. In this embodiment, mounting arms 1200-1, 1200-2 are used to attach the device 5 to the securing bar 604-3, another locking arm 1204 located within the device 5 is used to lock to the vertical bar 604-3. Thus the device 5 is attached to the container by hooking the mounting arms 1200 around a container locking bar 604, extending the movable locking arm 1204 outward by rotating a bar ratchet 1202 until the securing bar is tightly engaged. Once this process is completed the device 5 can be electronically locked by activating a servo 560 which further controls the locking arm 1204 (or ratchet 1202), as previously described, to electronically lock the device 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:
   a housing;
   a reusable mounting apparatus, attached to the housing to permit the housing to be attached and detached mechanically from a surface of a shipping container;
   circuitry, disposed within the housing, for determining status data associated with the attached shipping container; and
   an electrical actuator, for electrically activating or deactivating the reusable mounting apparatus
   wherein the reusable mounting apparatus further comprises:
   a shaped exterior portion on the housing, the position being shaped to accommodate positioning of the housing adjacent to a vertical locking bar associated with a shipping container; and
   a restraint mechanism, attached to the housing adjacent the shaped exterior portion, the restraint mechanism serving to secure the apparatus to the vertical locking bar.

2. An apparatus as in claim 1 wherein the shaped exterior portion is a recess formed on one surface of the housing.

3. An apparatus as in claim 2 wherein the restraint mechanism is a restraint latch, and the restraint latch is moveable from an open position to a closed position, whereby when the restraint latch is in an open position, the housing is free to be moved into position adjacent to or away from the vertical locking bar, and when the restraint latch is in a closed position, the housing is held in position against the vertical locking bar.

4. An apparatus as in claim 3 wherein the restraint latch is attached to the housing via a hinge pin such that the restraint latch may pivot on the hinge pin.

5. An apparatus as in claim 3 additionally comprising:
   a locking pin disposed within the housing, the locking pin being operable to selectively engage the restraint latch.

6. An apparatus as in claim 2 wherein the recess runs longitudinally along an axis of the housing.

7. An apparatus as in claim 1 wherein the shaped exterior portion is at least one extended arm member that is shaped to engage the vertical locking bar.

8. An apparatus as in claim 7 wherein the restraint mechanism is a second extendible arm member, also shaped to engage the vertical locking bar.

9. An apparatus as in claim 1 additionally comprising:
   a controller, connected to control the position of the restraint mechanism, so that the apparatus may be locked or unlocked in position on the locking bar under control of electrical signals.

10. An apparatus as in claim 9 wherein the controller is additionally connected to receive an activation signal sequence to control the position of the restraint mechanism.

11. An apparatus as in claim 10 wherein a hand-held electronic device is used to provide the activation signal sequence to the controller.

12. An apparatus as in claim 11 wherein the hand-held electronic device is connected to the controller via a wireless link.

13. An apparatus as in claim 1 additionally comprising:
   at least one cable, the cable attached to a status sensor, with the status sensor providing state information concerning at least one physical state of the container.

14. An apparatus as in claim 13 wherein the cable is attached to a lock integrity sensor, the lock integrity sensor being attached to detect a state of a physical locking apparatus on the container.

15. An apparatus as in claim 13 wherein the sensor is a light sensor placed in an interior portion of the container.

16. An apparatus as in claim 13 wherein the sensor senses an environmental condition associated with the container, the environmental condition selected from the group consisting of temperature, humidity, and pressure.

* * * * *